June 28, 1960     E. B. FARNAM     2,942,396
ROTARY MOWER
Filed Oct. 31, 1957
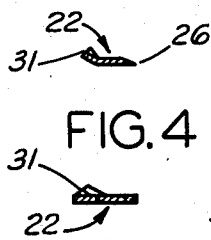
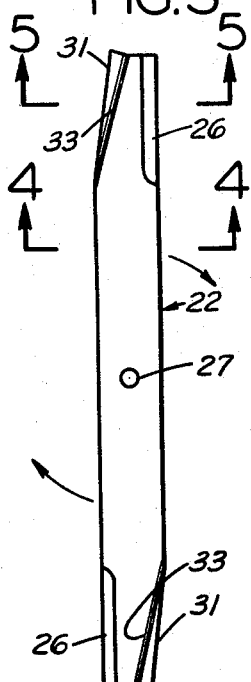
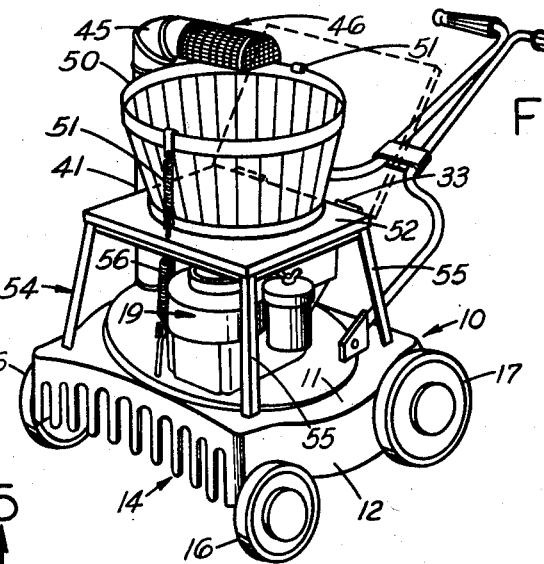
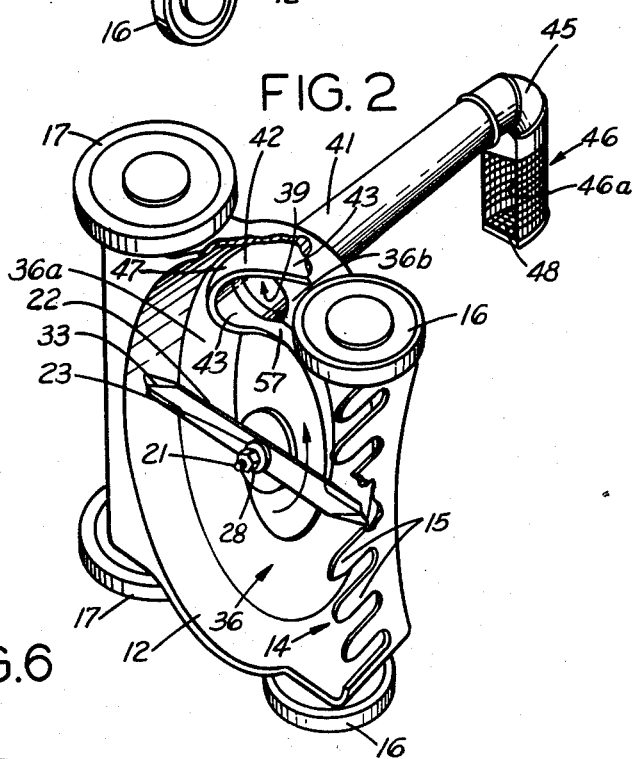
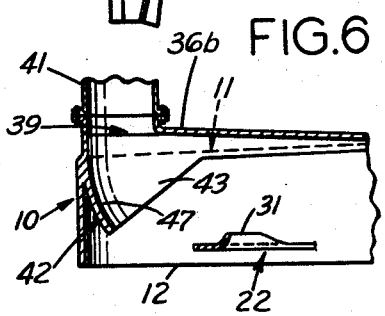
ELBERT B. FARNAM
INVENTOR.
BY Roger C. Johnson
ATTORNEY

United States Patent Office 2,942,396
Patented June 28, 1960

2,942,396

ROTARY MOWER

Elbert B. Farnam, 3401 14th St., Moline, Ill.

Filed Oct. 31, 1957, Ser. No. 693,598

2 Claims. (Cl. 56—25.4)

The present invention relates generally to lawn mowers and the like and more particularly to mowers of the rotary type, characterized by a knife or blade rotated rapidly in a horizontal plane, in which provision is made to catch and retain the clippings severed by the blade during its rotation and so prevent such material and other debris from falling back onto the lawn.

The object and general nature of this invention is the provision of a rotary mower in which means is incorporated in the device for discharging grass clippings and the like directly upwardly from the mower housing and into a container carried on a framework surmounting the motor, whereby the mower is dimensionally no greater than a conventional mower without any grass clippings catching and retaining means.

A further feature of this invention is the provision of a container-supporting platform overlying the motor yet so constructed and arranged that access to the motor, as for starting, servicing, and the like, is not impeded to any appreciable degree.

Another feature of this invention is the provision of a blade that performs both grass cutting and grass elevating functions and is so arranged relative to the grass conduit that the blade effectively forces air, grass clippings and the like directly upwardly into the conduit, which latter part leads directly upwardly to a grass container, such as a basket, supported on the associated platform. An additional feature of this invention is the provision of a grass conduit end or discharge outlet that is capable of dissipating the air blast from the conduit but ensuring that clippings and the like will fall gently into the associated container without being scattered or blown back onto the lawn.

These and other objects and advantages of this invention will be apparent to those skilled in the art to which the invention pertains after a consideration of the following detailed description, taken in conjunction with the accompanying drawings, in which:

Figure 1 is a perspective view of a lawn mower of the rotary type in which the principles of this invention have been incorporated.

Figure 2 is a perspective view of the underside of the mower shown in Figure 1, particularly illustrating the relation between the rotary blade and the grass clipping conduit.

Figure 3 is a plan view of the cutting blade.

Figure 4 is a section taken along the line 4—4 of Figure 3.

Figure 5 is a section taken along the line 5—5 of Figure 3.

Figure 6 is a fragmentary section in the nature of a development along the path of movement of the blade, showing the grass intercepting scoop in section, with associated parts.

Referring first to Figure 1, the lawn mower in which the present invention has been incorporated includes a housing 10 having a top wall 11 and a skirt or side wall portion 12 that is more or less peripherally continuous except for a front section 14 that is slotted to form dependent fingers 15 spaced apart to permit the grass to be cut to enter the mower housing. Front and rear ground wheels 16 and 17 are journaled on the housing in supporting relation. A motor 19 is mounted on the top wall 11 and is of usual construction, such as a gasoline engine. The motor is connected to drive a vertical shaft 21 that extends downwardly through the top wall 11 and has a rotor or cutting blade 22 fixed to the lower end of the shaft 21 by any suitable means, such as a slip clutch 23.

The blade 22 is of particular construction. As best shown in Figures 2–5, the blade has sharpened ends 26 forming cutting edges that face in the direction of rotation, shown by the arrow in Figure 2 and the arrows in Figure 3. The central portion of the blade is apertured, as at 27, to receive the motor shaft 21, and a nut 28 holds the blade on the shaft. When the blade 22 rotates the cutting edges 26 sever and shred the grass. Directly in back of the cutting edges 26 the blade ends have upwardly angled wings or vanes 31. These vanes may be formed as bent up portions of the stock of the blade, and they are bent on a line 33 that, as best shown in Figures 2 and 3, extends at an acute angle with respect to the longitudinal axis of the blade 22. Thus, not only do the vanes 31 exert a lifting effect on the grass and grass clippings, and as a consequence thereof they also act to propel the clippings upwardly toward the top wall 11 of the housing, but also, and what is of even more importance, vanes 31 have a gathering effect by virtue of the radially inward angularity of the vanes, as represented by the acute angular disposition of the lines of bend 33. The vanes 31 tend to keep the grass clippings from being thrown outwardly against the skirt or side wall portions 12; instead, the vanes ensure the upward displacement of the grass clippings.

In order to cooperate with the above described blade configuration, the housing top wall 11 is formed with a volute section 36 that lies directly above the path of movement of the cutting edges 26, and beginning at about the point indicated at 36a in Figure 2, the volute section 36 increases in effective height until at point 36b, Figures 2 and 6, the elevation of the top wall of the volute section is appreciable and the volute section 36 merges into an upwardly facing outlet 39 to which the lower end of a vertical stack 41 is fixed. Surrounding the outlet 39 in depending relation is a diversionary scoop section 42 that is shaped and angled so as to be in direct line with the circulating air and grass clippings and thereby enabled to intercept the same and direct the clippings and air flow directly upwardly into the stack 41. As best shown in Figs. 2 and 6, the scoop section 42 includes side walls 43 and a back wall 47 that form a generally concave portion, the back wall 47 (Fig. 6) curving in a downward and upstream direction, the side walls joining and faired into the side walls 57 of the volute section 36. It will also be seen from Figure 6 that, for example, the scoop-like section 42 extends downwardly to a point substantially in or closely adjacent the plane of rotation of the blade 22. In this connection it is to be noted that the vanes 31 extend upwardly an amount sufficient to create an appreciable air flow along in the generally horizontal direction of the volute 36 toward the outlet scoop 42. The latter is shown as an integral part of the housing 10, but it is to be understood that the part 42 may be supplied as an addition to an existing housing.

The air blast and grass clippings directed up the stack 41 pass upwardly through the latter and out an elbow 45 into a horizontal conduit 46 in the form of a reticulated or screen-like part having an open bottom 46a. The end 48 is of screen material also. The screen member 46 serves to rapidly dissipate the blast of air but at a low velocity while the grass clippings fall gently into a basket 50 or other container situated directly under the grass outlet 46.

As shown in Figure 1, the container 50 is held by spring retainers 51 on a flat support or platform 52 hinged at 53 on a supporting framework 54 fixed to the top of the housing 10. The supporting framework 54 includes four legs 55 that, in effect, straddle the motor 19 and support the platform 52 well above the motor. The lower ends of the legs 55 are connected to the top of the housing 10 by bolts or other suitable means. The basket platform 52 is releasably retained in position by a spring latch 56 that, when released, permits the platform to be swung upwardly after the basket has been removed to provide access to the motor 19, as for starting, service and the like.

While I have shown and described above the preferred structure in which the principles of my invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. A rotary mower comprising a housing having an upper wall in which an upwardly facing outlet is formed, a power actuated rotor mounted in said housing and having cutting ends movable generally circularly in a horizontal plane disposed underneath the upper wall of said housing, a volute portion formed in the upper wall of the housing and progressively increasing in height from a point adjacent one side of said outlet around said housing and terminating at said outlet, said volute portion lying substantially directly above the path of movement of said rotor cutting ends, a grass and air deflecting scoop fixed to the underside of said upper wall at the point of greatest height of said volute portion and comprising a generally concave structure having curved walls generally encircling the upper wall outlet and two opposite portions of said curved wall structure being spaced apart substantially the same distance as the width of said volute portion, the side walls being faired into the sides of said volute portion and the back wall of said scoop being curved rearwardly and upwardly so as to guide air and clippings from said volute portion upwardly through said outlet, and a discharge stack leading substantially directly upwardly from said outlet.

2. A rotary mower comprising a housing having an upper wall, a generally vertical shaft carried by said upper wall, a blade fixed to the lower end of said shaft below said upper wall and having ends shaped to divert clippings generally upwardly, said wall having a volute portion lying above the path of movement of said blade ends, said volute portion facing downwardly and progressively increasing in height in the direction of blade end movement toward an outlet formed in said upper wall, said volute portion terminating in a downwardly disposed scoop section that extends downwardly to a point closely adjacent the path of movement of the blade ends and said scoop section having a curved back wall and side walls joining the side walls of said volute section and the downstream portion of said scoop section forming said back wall and curved downwardly and circumferentially upstream relative to the path of movement of said blade ends, whereby clippings carried along with said blade ends are diverted upwardly through said outlet in a smooth streamlined flow.

References Cited in the file of this patent

UNITED STATES PATENTS

| | | |
|---|---|---|
| 1,336,257 | Muzzy | Apr. 6, 1920 |
| 2,570,541 | Gabrielson | Oct. 9, 1951 |
| 2,720,070 | Arrington | Oct. 11, 1955 |
| 2,724,229 | Graham | Nov. 22, 1955 |
| 2,752,699 | Gustafson | July 3, 1956 |
| 2,777,270 | Colclazier | Jan. 15, 1957 |
| 2,779,146 | Mitchell et al. | Jan. 29, 1957 |
| 2,809,389 | Collins et al. | Oct. 15, 1957 |
| 2,830,428 | Speegle | Apr. 15, 1958 |
| 2,836,029 | Johnson | May 27, 1958 |
| 2,851,844 | Bailey | Sept. 16, 1958 |